(12) United States Patent
Suresh

(10) Patent No.: US 7,949,780 B2
(45) Date of Patent: May 24, 2011

(54) ADAPTIVE FLOW CONTROL TECHNIQUES FOR QUEUING SYSTEMS WITH MULTIPLE PRODUCERS

(75) Inventor: Charles E. Suresh, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 333 days.

(21) Appl. No.: 12/022,056

(22) Filed: Jan. 29, 2008

(65) Prior Publication Data
US 2009/0193141 A1 Jul. 30, 2009

(51) Int. Cl.
- *G06F 15/16* (2006.01)
- *H04L 12/26* (2006.01)
- *H04L 12/28* (2006.01)

(52) U.S. Cl. .......................................... 709/235; 370/412
(58) Field of Classification Search .................. 709/203, 709/217, 219, 225, 232, 235; 370/235, 412
See application file for complete search history.

(56) References Cited

U.S. PATENT DOCUMENTS

| | | | |
|---|---|---|---|
| 7,496,032 B2* | 2/2009 | Gonzalez et al. | 370/229 |
| 2002/0087714 A1* | 7/2002 | Connor | 709/235 |
| 2003/0128665 A1* | 7/2003 | Bernhard et al. | 370/230 |
| 2005/0063307 A1* | 3/2005 | Samuels et al. | 370/235 |
| 2006/0002413 A1* | 1/2006 | Tsutazawa et al. | 370/412 |
| 2006/0230239 A1* | 10/2006 | Blumrich et al. | 711/146 |

\* cited by examiner

*Primary Examiner* — Ranodhi N Serrao
*Assistant Examiner* — Farrukh Hussain
(74) *Attorney, Agent, or Firm* — Martine Penilla & Gencarella, LLP

(57) ABSTRACT

Provided is a method, computer program and system for controlling the flow of service requests originated by a plurality of requesters. The method includes adding an additional control mechanism, which includes a serializer and a serializer queue, between the requesters and the service provider. The serializer inhibits the requesters when the serializer queue size reaches a threshold for a period proportional to the number of requesters already waiting, the queue length and the serializer service time. When the service provider queue is full or at a critical level, the serializer is inhibited for a period of time that is the approximately the difference between the service times of the serializer and the service provider. In addition, when the service provider queue is full, the service provider service time is recalculated as a function of the serializer service time and of the time required to process requests by the service provider.

12 Claims, 7 Drawing Sheets

ADAPTIVE FLOW CONTROL TECHNIQUES FOR QUEUING SYSTEMS WITH MULTIPLE PRODUCERS

BACKGROUND

1. Field of the Invention

The present invention relates to managing flow control in a system with a plurality of requesters being serviced by a service provider.

2. Description of the Related Art

Flow control is the management of service request flow between requesters and servers in a computing environment to optimize throughput while minimizing resource utilization. When the service requests exceed the service processing capability, the system must control the inflow of requests in order to enable the server or servers to process the incoming requests. If the contention for services is not managed properly, lost data or wasted resources can occur due to the potential overflow of the system or the overhead of dealing with duplicate requests.

A variety of flow control mechanisms are known in the art, falling generally into the categories of dynamic control and static rate control. Dynamic flow control methods track congestion in real time, and regulate flow based on current congestion levels. Static rate control, on the other hand, uses pre-configured values, which are typically set by a management entity based on known capacities of the system.

Flow control is needed at many levels, from managing access to shared resources, such as memory inside a computer system, to managing distribution of information in distributed systems connected via a network.

It is in this context that embodiments of the invention arise.

SUMMARY

Embodiments of the present invention provide a method, a computer program, and a system for controlling the flow of service requests originated by a plurality of requesters. The method includes adding an additional control mechanism, which includes a serializer and a serializer queue, between the requesters and the service provider. The serializer inhibits the requesters when the serializer queue becomes full. In addition, when the service provider queue is full or at a critical level, the serializer is inhibited for a period of time that is approximately the difference between the service times of the serializer and the service provider, thus allowing the service provider to process at least one request and creating additional room in the service provider input queue. Also, if the service provider queue gets full, the service provider service time is recalculated as a function of the serializer service time and of the time required to process requests by the service provider in order to better synchronize the serializer with the service provider.

It should be appreciated that the present invention can be implemented in numerous ways, such as a process, an apparatus, a system, a device or a method on a computer readable medium. Several inventive embodiments of the present invention are described below.

In one embodiment, a method for controlling the services provided to a plurality of producers in a queuing system is provided. A service request from a producer is inhibited temporarily when the number of service requests waiting processing exceeds a threshold. In one embodiment, the threshold corresponds to the maximum queue length of the serializer that inhibits the producers. Additionally, the service requests are serialized for processing by the service provider, and then transferred at a controlled rate. The transfer rate is controlled in order to match the current service rate of the service provider to optimize the flow of requests. The controlled service rate is adjusted over time to keep up with the changing service rate delivered by the service provider.

In another embodiment, a system for controlling the services provided to a plurality of producers is provided. The system includes a serializer that controls the flow of service requests from the producers, a serializer queue that holds the service requests from the producers, a service provider that processes service requests coming from the serializer, and a service provider queue that holds the service requests coming from the serializer. The serializer inhibits temporarily a service request from a producer when the number of service requests waiting processing exceeds a threshold. Additionally, the serializer transfers the service request to the service provider at a controlled rate and adjusts the controlled service rate to be equal to the current value of the service provider service rate.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1:
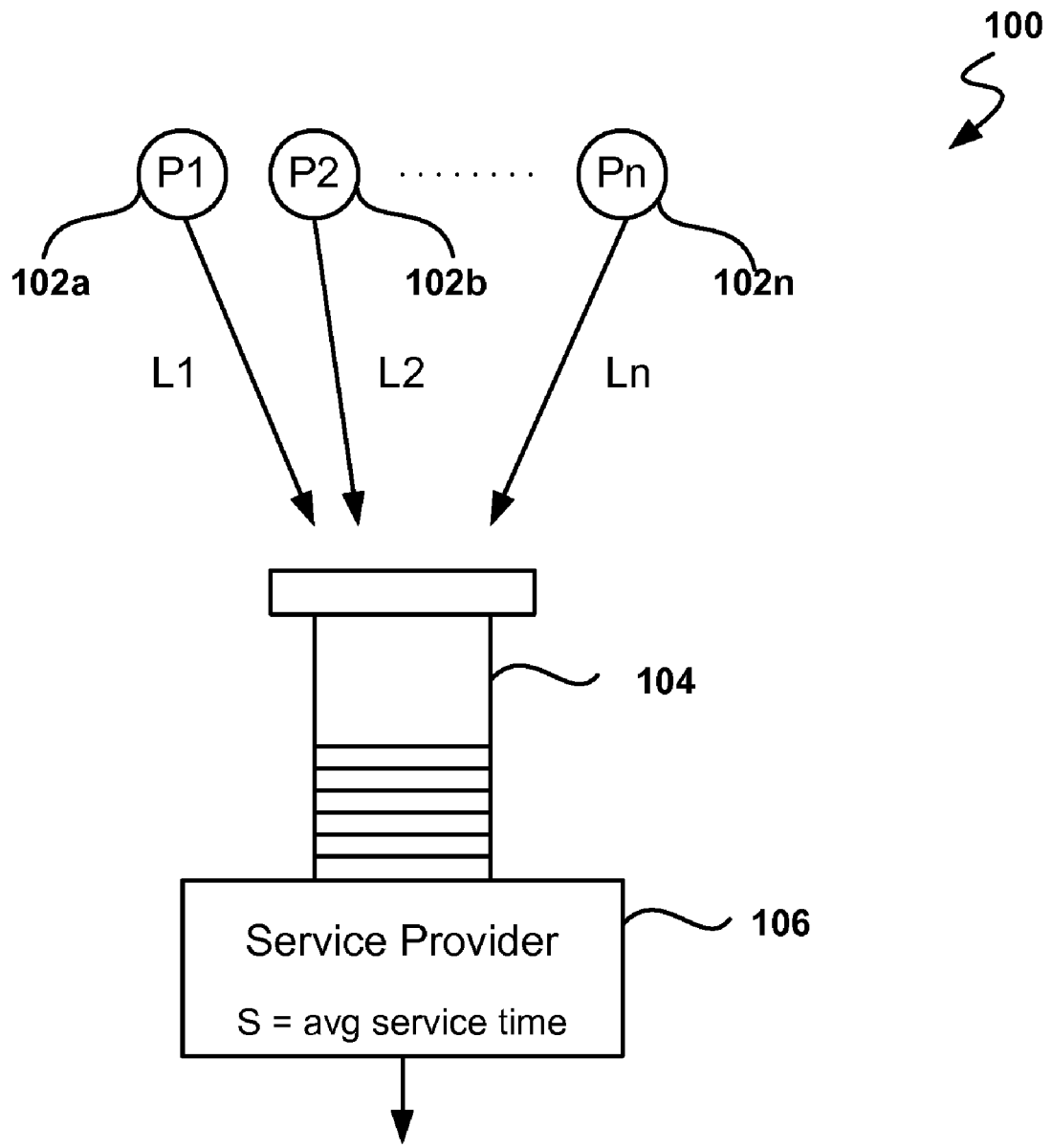
FIG. 1 depicts a plurality of producers placing requests for a service provider in a service queue.

Provided is a method, a computer program and a system for controlling the flow of service requests originated by a plurality of requesters. The method includes adding an additional control mechanism, which includes a serializer and a serializer queue, between the requesters and the service provider. The serializer controls the flow of service requests to be delivered to the service provider. To control the flow, the serializer inhibits the requesters, such as putting a thread to sleep, if the serializer queue becomes full. The inhibition period is proportional to the number of requesters already waiting, the serializer maximum queue length and the serializer service time.

The serializer service time is approximately the same as the service provider's service time, but the service provider time may change over time requiring the adjustment of the serializer service time. When the service provider queue is full or at a critical level, the serializer is inhibited for a period of time that is approximately the difference between the service times of the serializer and the service provider. In addition, when the service provider queue is full, the service provider time needs to be re-estimated because the serializer is transferring service requests faster than the service provider can process. The service provider service time is recalculated as a function of the serializer service time and of the time required to process requests by the service provider.

The serializer's goal is to transfer service requests at the same rate that the service provider can process the service requests, requiring the monitoring of the actual changes in the service provider service rate. If the system produces requests at a faster rate than the service provider is able to deliver, the serializer inhibits producers to allow the service provider to "catch up" and minimizing waste of cycles in the system, thereby obtaining performance improvements.

It will be obvious, however, to one skilled in the art, that the present invention may be practiced without some or all of these specific details. In other instances, well known process operations have not been described in detail in order not to unnecessarily obscure the present invention.

The embodiments described used terms commonly used in queuing theory or flow control systems. The person skilled in the art will appreciate that the concepts described inhere can easily be used in situations where flow control is required. For example, the terms 'producer' and 'requester' are equivalent and refer to the entities originating service requests, such as a process needing access to a page in memory. Other terms can also be used, such as client, data source, process, etc. Similarly, the term 'service provider' is used to describe the entity processing the service requests originated by the requesters, but other terms such as data sink, socket, process, port, etc. also apply. The term 'serializer' has been used for the entity that receives requests from the producers and then transfers the requests to the service provider queue. Equivalent terms to 'serializer' are multiplexer, demultiplexer, buffer, semaphore, etc.

Still yet, embodiments of the invention describe inhibiting as putting to sleep a thread corresponding to the requester, but the concept can be applied to distributed systems where inhibiting can be accomplished by sending a control message to a remote entity signaling a waiting period before sending the next request, by disabling new requests from a producer for a period of time, by dropping requests, by using semaphores to control access to the serializer, etc.

FIG. 1 depicts a plurality of producers placing requests for a service provider in a service queue. Producers P1 102a, P2 102b, and Pn 102n generate requests for service at rates L1, L2, and Ln respectively. The requests are placed in service queue 104 that is used by service provider 106 to process the incoming requests. In one embodiment, queue 104 uses a First In First Out (FIFO) algorithm to process the requests. In other embodiments, different processing algorithms are used, such as Last In First Out (LIFO), round robin, hot potato, shortest first, random, by priority, according to quality of service (QOS), etc.

The requests can be of many kinds, such as for example, requests for a memory page, input/output data processing, sending/receiving network packets, access to peripherals such as printers, displays, game controllers, speakers, and CD-ROMs, etc. Service provider 106 services the incoming requests using an average service time of S, which corresponds to a maximum service rate of 1/S.

Figure 2:
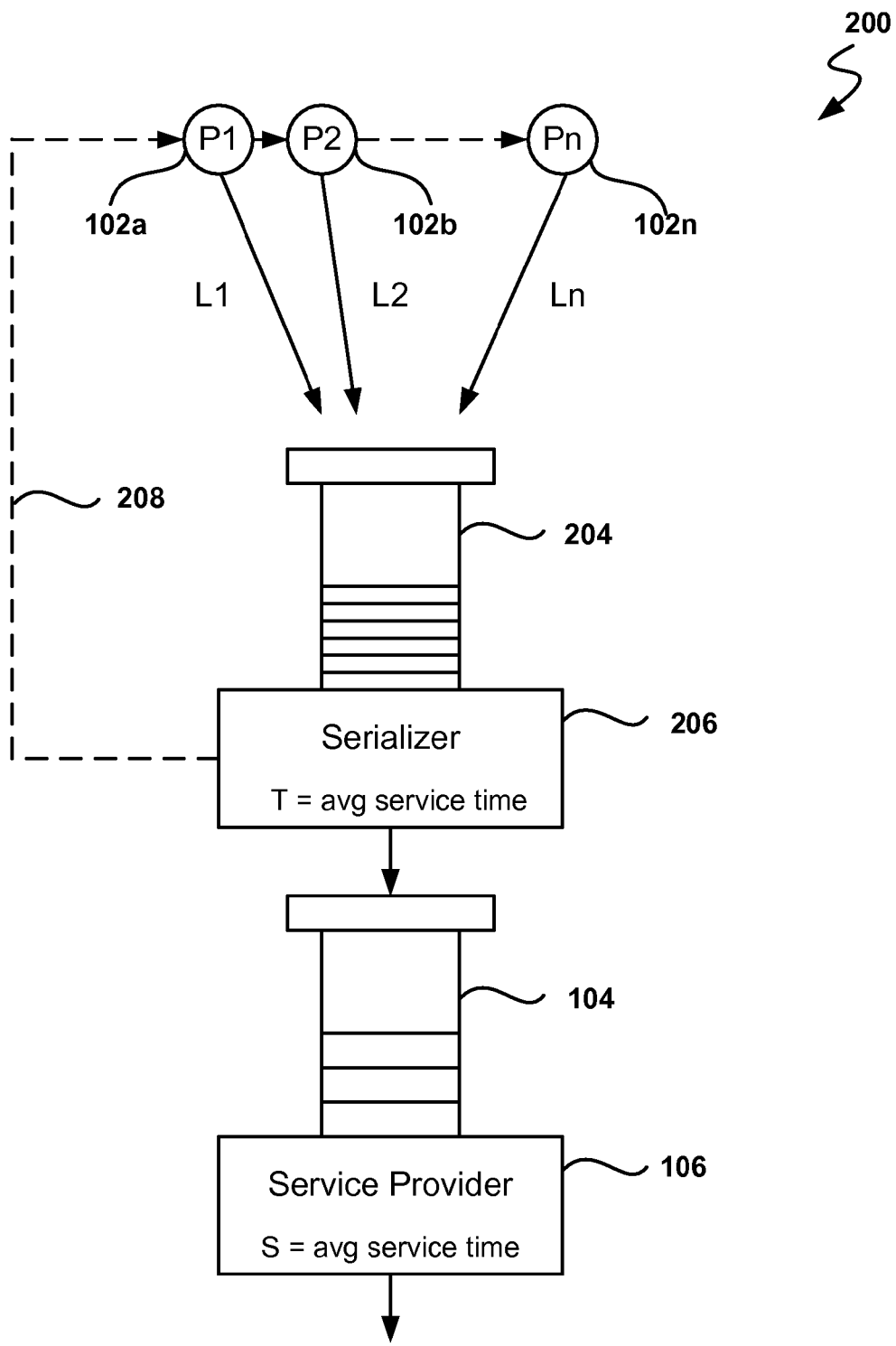
FIG. 2 describes a system including a serializer and a serializer queue to control request flow according to one embodiment.

FIG. 2 describes a system including serializer 106 and serializer queue 204 to control request flow according to one embodiment. Serializer 206 and serializer queue 204 have been added to the system described previously in FIG. 1. Serializer queue 204 holds the requests from producers P1, P2, and Pn, that are processed by serializer 206, also known as a flow controlled multiplexer, to transfer the service requests to service provider 106. Serializer 206 uses control mechanism 208 to inhibit the requesters and throttle the incoming service requests to enable a request rate that matches the service rate of service provider 106. For description purposes, the serializer average service time is T, which corresponds to a maximum serializer service rate of 1/T. Similar to the service provider queue, the serializer queue can use different processing algorithms, such as FIFO, LIFO, etc.

It should be noted that the serializer does not have a real service time since it does not do any real processing. We have used service time T, as a mechanism to describe the request processing delay introduced by the serializer. This can also be accomplished by using a queuing time introduced by the serializer followed by a service time of zero, that is, incoming requests wait a certain amount of time in the queue before receiving instantaneous processing by the serializer once requests leave the serializer queue. Any mechanism that delays incoming requests for a period of T will accomplish the desired effects.

The flow control is necessary so internal queue sizes can be bounded. The serialization of access to the resource improves the CPU efficiency (for example if access to the resource was controlled by means of spin/adaptive locks). There is the constraint that the queues do not build up indefinitely, which is accomplished by throttling the incoming service requests if the combined input rate from the requesters is greater than 1/T, and by ensuring that the delta (T−S) is as small as possible, or in other words, that T is as close as possible to S.

It should be noted that requests rates L1, L2, and Ln may vary dynamically, as well as service time S. As a result, serializer 206 must adapt to the changing environment while trying to maintain output queue 104 as full as possible. The throttling applied to the incoming service requests must be proportional to the length of the queue 204 building up at serializer.

In those cases where S cannot be determined programmatically, such as the case of a hardware device, the following equation is used to determine S:

$$S = \frac{LT}{L - QT}$$

L is the time required by Q elements to fill up output queue 104. Assuming that S>T so serializer queue 204 can fill up, there will be a net addition of (S−T) elements to service provider queue 104 after a period of T*S. For example, if S is 9 seconds and T is 4 seconds, in 36 seconds (T*S), S will have processed 4 requests and T will have processed 9, a different of 5 requests (9−4). Therefore, the time to add one request to the queue is TS/(S−T). If the maximum service provider queue 104 size is Q, then it will take a time L of QTS/(S−T) to fill the queue, which can be rearranged as seen in the equation for S described above. In another embodiment, S is monitored continuously and the value of T is adjusted accordingly. For example, T can be made equal to the average of the service request times for the last 10, 100, or 1000 requests.

In one embodiment, the system can be described using three operations: creation of the serializer, addition of requests to the serializer queue, and process of requests at the serializer. For description purposes, the producers, the serializer and the service provider are running in independent threads inside a computer system, but the principles here described apply equally to other system with producers and service providers not using threads. Pseudo-code is used below to describe these operations.

In the first operation, the serializer, also known as the multiplexer, is created. The primitive takes three parameters, the multiplexer queue size U, the name of the function that processes service requests, and a transparent datum that can be passed to the function servicing process requests.

M=mux_create(U, process, cookie)
    queue=create_queue(U) # create a buffer queue
    create a thread to run mux_processor( ) # mux_processor defined below save copies of length, process and cookie, etc.

The second primitive is used to add a request to the serializer queue. The throttling of incoming threads is achieved by making threads sleep whenever the serializer queue is full. The threads sleep for a length of time proportional to the number of producers already waiting in the queue plus half the length of the serializer queue. One half of the queue is chosen to provide some pipeline overlap between the requesters and the service provider, but other values are also possible, such as one third of the queue length, three fourths of the queue, the maximum queue length minus a predetermined value, a predetermined value, etc.

In another embodiment, the sleep time is proportional to a dynamically calculated value instead of being proportional to a predetermined value, such as half the length of the serializer queue. A fraction, say F, of the length of the queue is used to provide sufficient overlap between the producer and the consumer. If the two sides are perfectly balanced (S==T) then a value of 0.5 for F is optimal, which translates to half of the queue length. Using a lower value of F, such as 0.1, would cause the serializer to wake up more often and the service queue to fill up quicker than if F has a larger value, such as 0.9. The downside to a large value of F is that the probability of a queue underrun is higher. These extreme values for F make sense when S substantially differs from T and the serializer is still hunting toward the true value from T to S. The dynamically calculated value aims at converging T towards S and would depend on the current size of the serializer queue and the difference in values between T and S.

The routine to queue service requests, using the predetermined value, is described in pseudo-language as:

```
mux_queue(m,datum)
    if (mux queue full) {
        Increment W # W is the number of requests waiting
        sleep((U/2+W)*T)
        Decrement W }
    add datum to serializer queue and wake up mux_processor thread if required
```

The third routine serializes the requests and transfers them to the service provider queue for processing. The routine also calculates the current values of S and T. Whenever the service queue becomes full, S is recalculated and the serializer is put to sleep for a time of (S−T) to allow the service provider to "catch up" with the incoming requests. In addition, T is recalculated so T is kept as close as possible to S. It should be noted that if S<T, then the service queue never becomes full. The routine mux_processor( ) used to process requests at the serializer can be described as follows:

```
mux_processor( )
    while (1) {
        wait for data to show up on mux queue;
        nelements=0;
        start=length of output queue;
        bigbang=current time;
        starttime=bigbang;
        while (more data to be processed) {
            if (output queue full) {
                endtime=current time;
                end=length of output queue;
                L=endtime-starttime;
                Q=end-start;
                S=L*T/(L-Q*T);
                sleep(S-T);
                start=length of output queue;
                starttime=current time;
            }
            process(datum, cookie) # this will append datum to
                output queue
            increment nelements;
        }
        bigcrunch = current time;
        T=(bigcrunch-bigbang)/nelements;
    }
```

Figure 3:
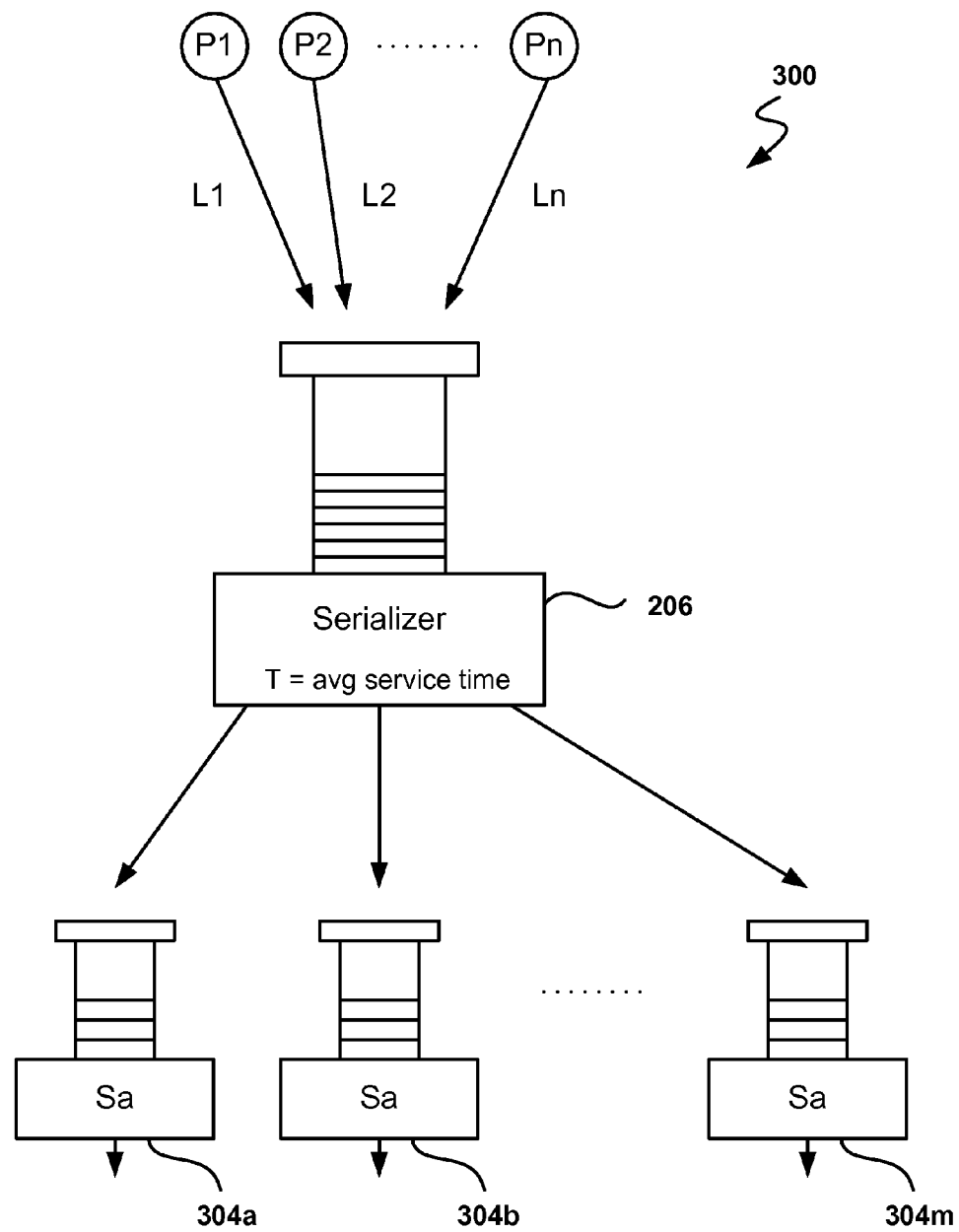
FIG. 3 describes a system with a plurality of service providers working in tandem and being controlled by one serializer for one embodiment of the invention.

FIG. 3 describes a system with a plurality of service providers working in tandem, or parallel, and being controlled by one serializer according to one embodiment of the invention. The principles describe in FIG. 2 can be applied to other client/server systems. For example, with respect to FIG. 3, one serializer 206 can be used to manage a set of service providers 304a, 304b, and 304m, working in parallel. Any of the service providers 304a, 304b, and 304m can service requests coming from the requesters. The serializer queue will have to reflect that there are m different queues to process incoming requests. Similarly, the service time T of the serializer will be calculated taking in consideration that the average service time of a request is the average service time for the service providers divided by the number of service providers. Also, when calculating S, the maximum queue size for the service providers is the sum of all the input queues to the service providers.

Figure 4:
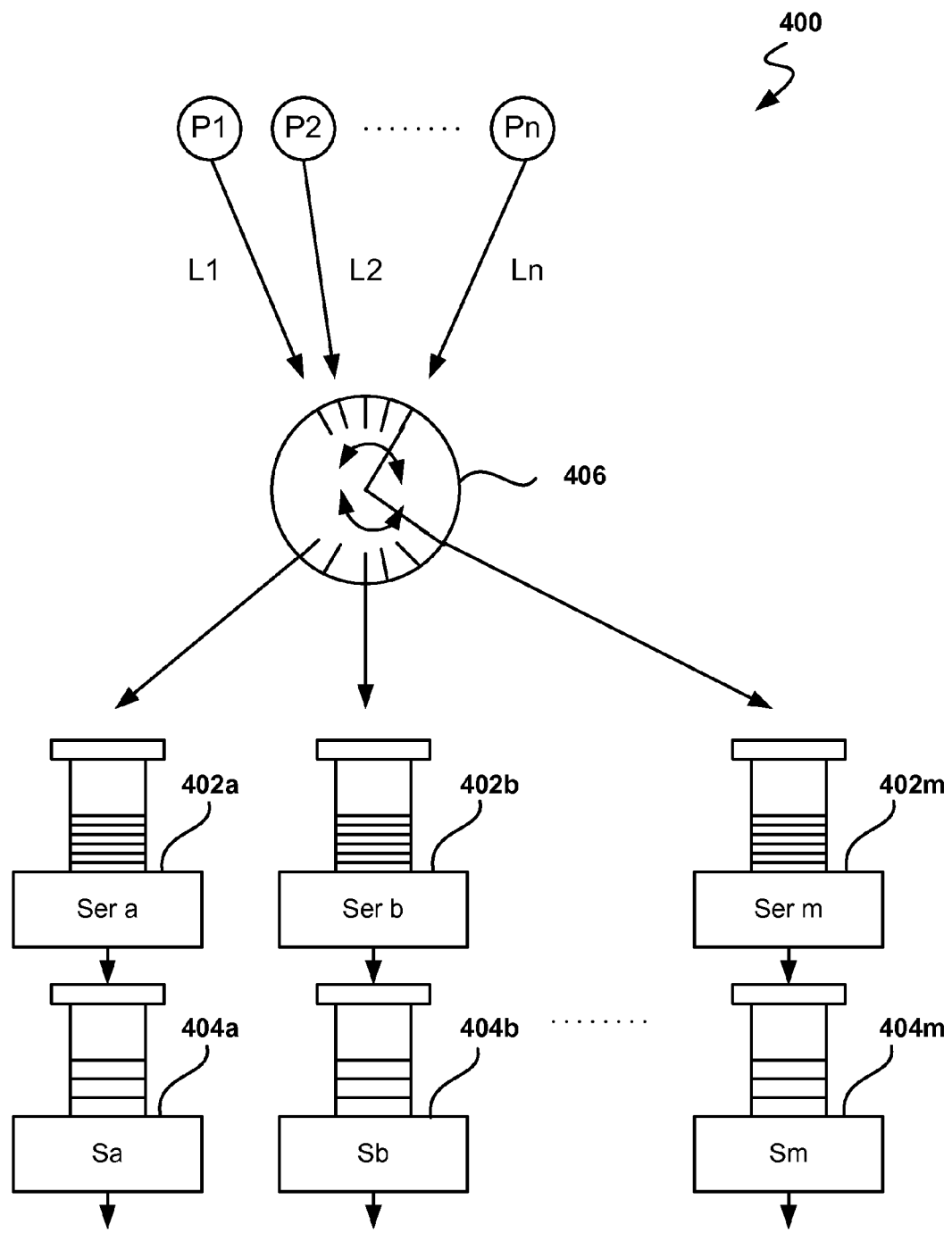
FIG. 4 depicts a system with a plurality of service providers where the flow to each service provider is controlled by a different serializer according to one embodiment.

FIG. 4 depicts a system with a plurality of service providers where the flow to each service provider is controlled by a different serializer according to one embodiment. In this system, one serializer (such as 402a, 402b, 402m) is added to each service provider 404a, 404b, and 404m, where the service providers are working in parallel. Distributor 406 delivers the incoming service requests to the different serializer queues, where the same principles will apply as described with respect to FIG. 2.

In another embodiment, the concept is expanded to multiple hierarchies of depth K with N producers each fanning out to M serializers which are serviced by S consumers, that is, a K×N×M×S queuing system.

Figure 5:
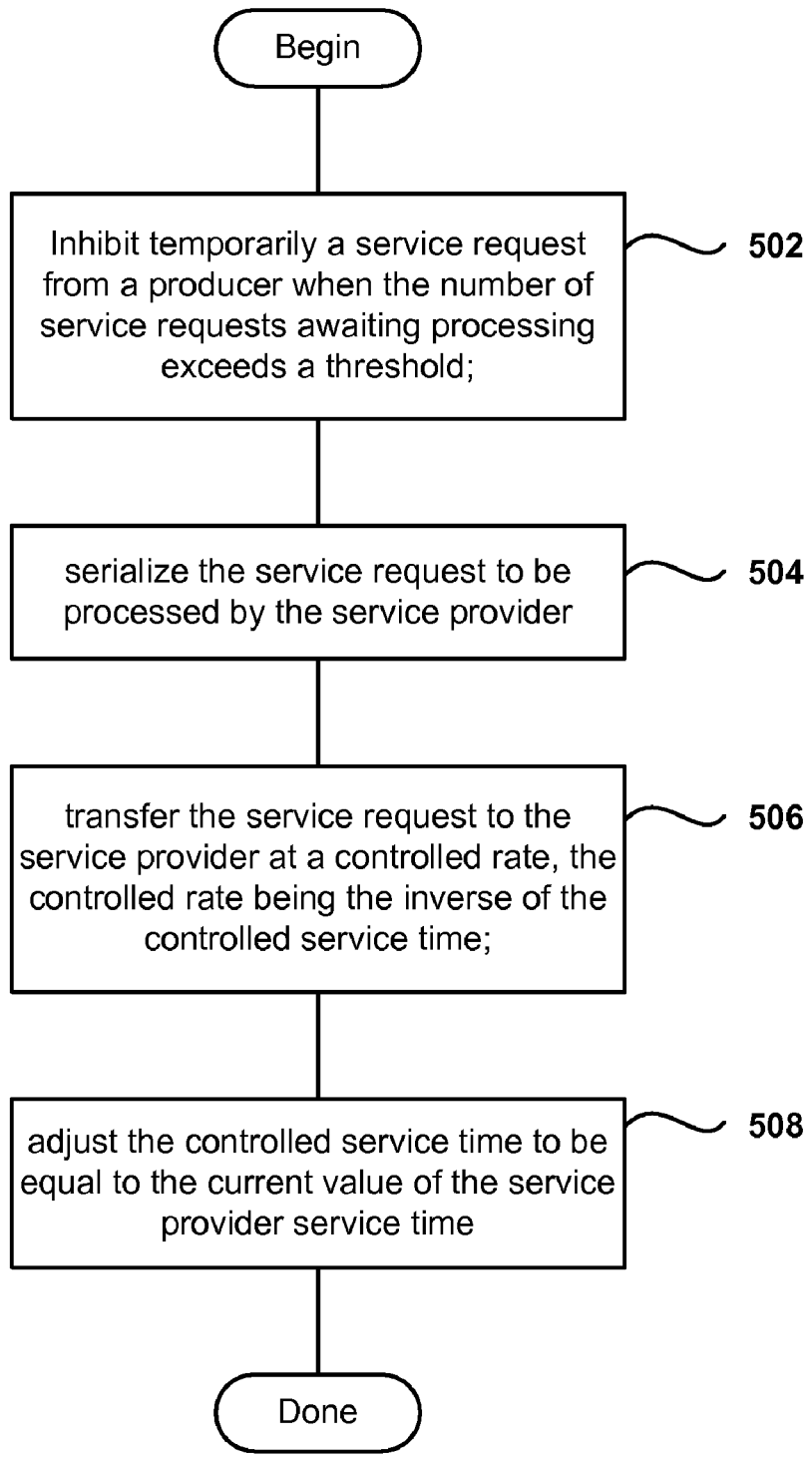
FIG. 5 shows the flow of an algorithm to control the service provided to a plurality of requesters for one embodiment of the invention.

FIG. 5 shows the flow of an algorithm to control the service provided to a plurality of requesters for one embodiment of the invention. In operation 502, service requests originated by a producer, such as P1, P2, or Pn as described with respect to FIG. 2, are temporarily inhibited if the number of service requests awaiting service exceeds a threshold. In one embodiment, the threshold is the maximum queue size of serializer queue 204 as described with respect to FIG. 2.

In operation 504, the service requests coming from the different requesters are serialized into one single queue for processing. In operation 506, the service requests previously serialized are transferred to the service provider at a controlled rate. In one embodiment, the controlled rate is the service rate of the serializer controlling the request flow towards the service provider.

In operation 508, the controlled service time is adjusted to be the current value of the service provider service time. By making the serializer service time equal to the service provider service time, as described hereinabove, the system guarantees that the queue for the service provider is kept full to optimize system performance.

Figure 6A:
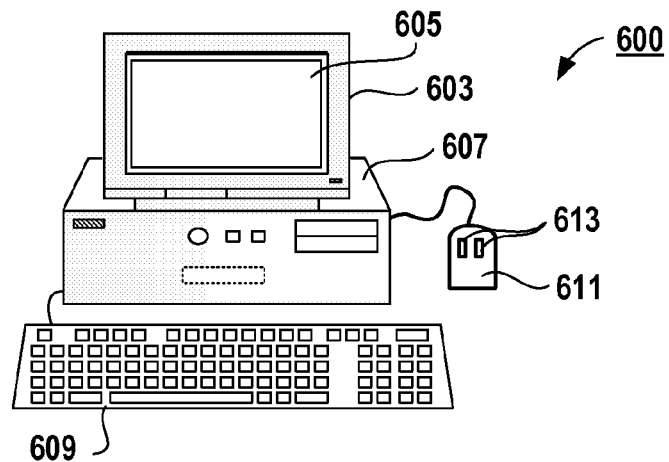
FIG. 6A is an illustration of an embodiment of an exemplary computer system suitable for use with the present invention including display having display screen.

FIG. 6A, is an illustration of an embodiment of an exemplary computer system 600 suitable for use with the present invention including display 603 having display screen 605. Cabinet 607 houses standard computer components (not shown) such as a disk drive, CDROM drive, display adapter, network card, random access memory (RAM), central processing unit (CPU), and other components, subsystems and devices. User input devices such as a mouse 611 having buttons 613, and keyboard 609 are shown.

Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 6B:
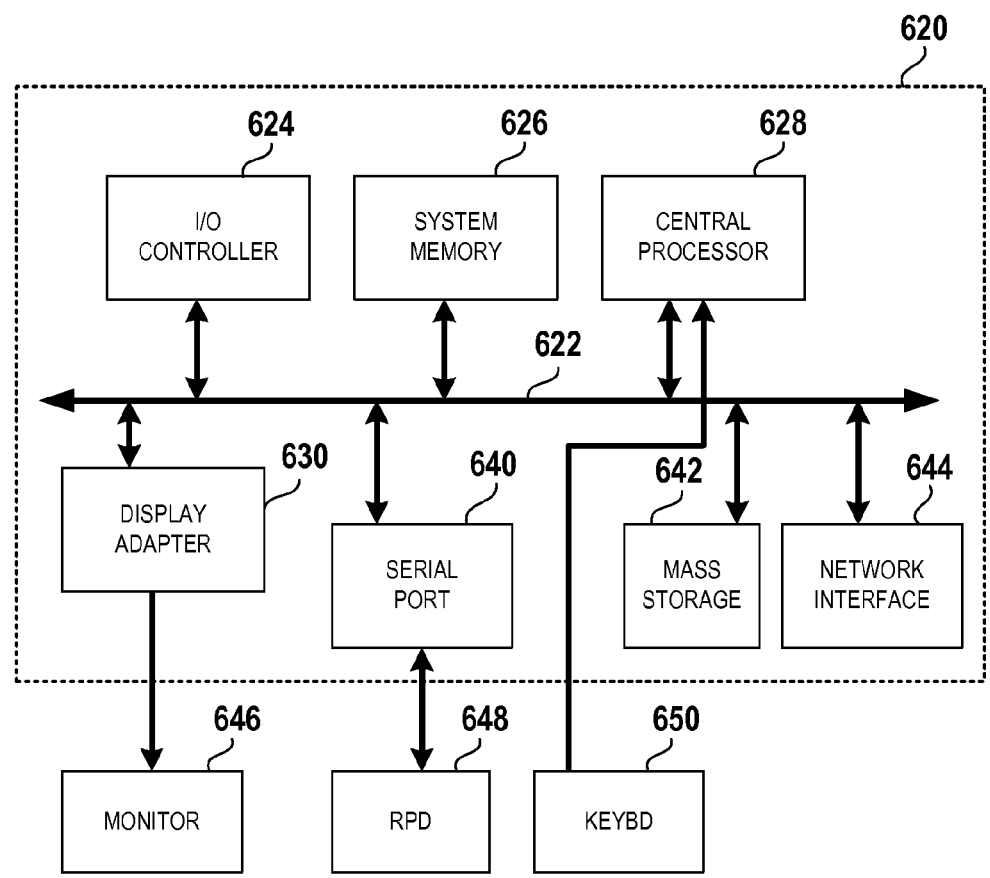
FIG. 6B illustrates subsystems that might typically be found in a computer.

FIG. 6B illustrates subsystems that might typically be found in a computer such as computer 600. In FIG. 6B, subsystems within box 620 are directly interfaced to internal bus 622. Such subsystems typically are contained within the computer system such as within cabinet 607 of FIG. 6A. Subsystems include input/output (I/O) controller 624, System Random Access Memory 9RAM) 626, Central Processing Unit (CPU) 628, Display Adapter 630, Serial Port 640, Fixed Disk 642 and Network Interface Adapter 644. The use of bus 622 allows each of the subsystems to transfer data among the subsystems and, most importantly, with the CPU. External devices can communicate with the CPU or other subsystems via the bus 622 by interfacing with a subsystem on the bus. Monitor 646 connects to the bus through Display Adapter 630. A relative pointing device (RPD) 648 such as a mouse connects through Serial Port 640. Some devices such as a Keyboard 650 can communicate with the CPU by direct means without using the main data bus as, for example, via an interrupt controller and associated registers (not shown).

As with the external physical configuration shown in FIG. 6A, many subsystem configurations are possible. FIG. 6B is illustrative of but one suitable configuration. Subsystems, components or devices other than those shown in FIG. 6B can be added. A suitable computer system can be achieved without using all of the subsystems shown in FIG. 6B. For example, a standalone computer need not be coupled to a network so Network Interface 644 would not be required. Other subsystems such as a CDROM drive, graphics accelerator, etc. can be included in the configuration without affecting the performance of the system of the present invention.

Figure 6C:
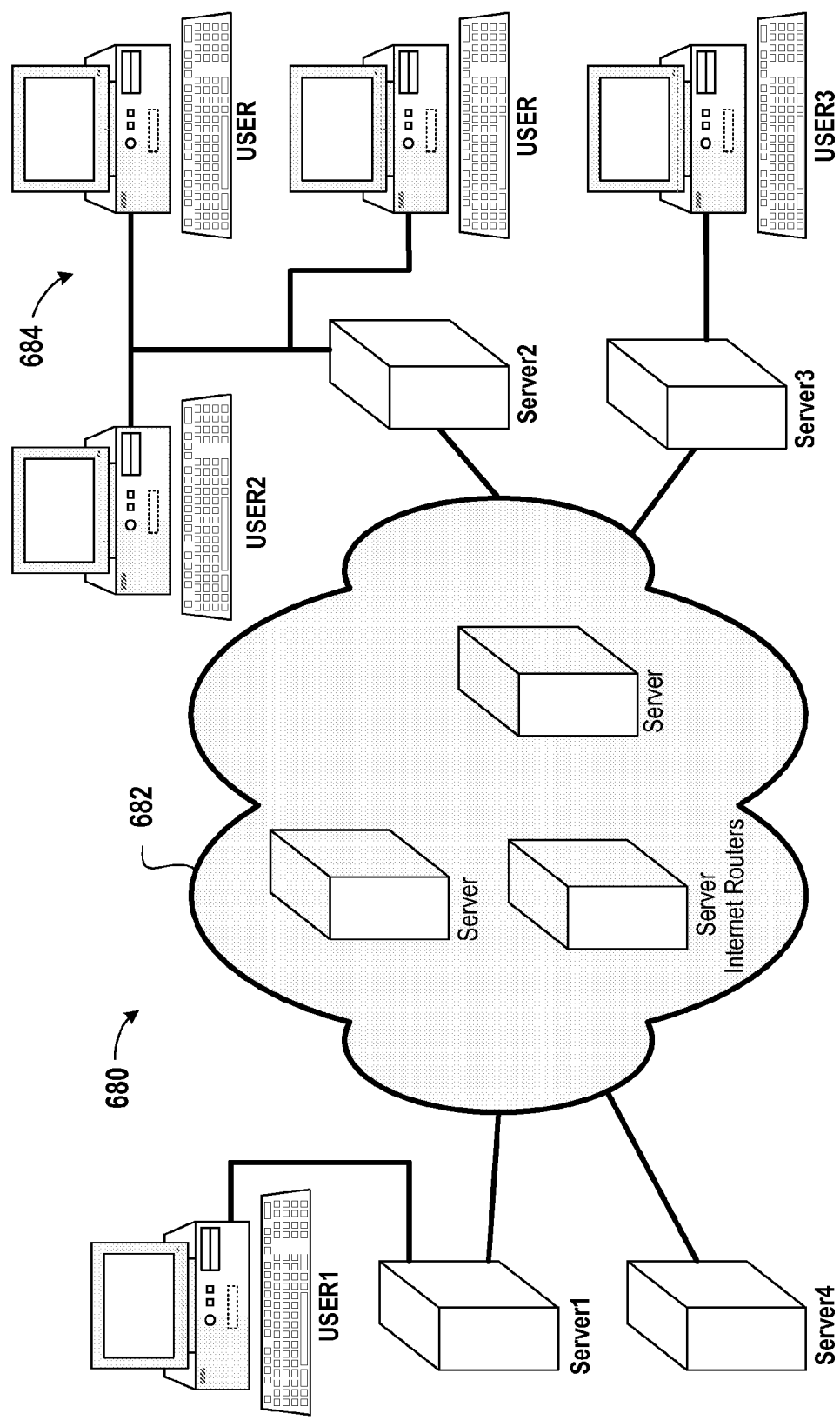
FIG. 6C is a generalized diagram of a typical network.

FIG. 6C is a generalized diagram of a typical network. In FIG. 6C, the network system 680 includes several local networks coupled to the Internet. Although specific network protocols, physical layers, topologies, and other network properties are presented herein, embodiments of the present invention are suitable for use with any network.

In FIG. 6C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of sever routers 682. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet.

Similarly, other computers at 684 are shown utilizing a local network at a different location from USER1 computer. The computers at 684 are couple to the Internet via Server2. USER3 and Server3 represent yet a third installation.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network. Embodiments may be practiced in any arbitrary queuing system, such as cars passing through toll-booths, drive-thru sales, satellite broadcasting, unloading cargo from ships, check-out counters, ticket purchase lines, etc.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for controlling service provided to a plurality of producers in a queuing system, the method comprising:
   receiving a service request from a producer;
   inhibiting temporarily the producer after receiving the service request when a number of service requests awaiting processing exceeds a threshold;
   a serializer being a computer program serializing the service request, the serializing including placing the service request in a serializer queue, the serializer controlling delivery of service requests to a service provider;
   transferring the service request from the serializer queue to a service provider queue at a controlled rate equal to a service rate of the service provider, the controlled rate being an inverse of a controlled service time; and
   adjusting the controlled service time to be equal to a current value of a service provider service time for processing service requests, wherein inhibiting temporarily the producer further includes inhibiting the producer making the service request for a producer waiting time, the producer waiting time being equal to the controlled service time multiplied by a sum of a number of producers inhibited plus a predetermined fraction of a maximum length of the serializer queue.

2. The method as recited in claim 1, wherein the threshold is equal to the maximum length of the serializer queue, the serializer queue holding service requests from the producers.

3. The method as recited in claim 1, wherein transferring the service request further includes,
   waiting for a serializer waiting time when the service provider queue is full, the serializer waiting time being equal to a difference between the service provider service time and the controlled service time,
   adjusting the service provider service time to be equal to a time to process a number of service requests multiplied by
   the controlled service time multiplied by
   an inverse of a difference between
   the time to process the number of service requests and
   the number of service requests multiplied by the controlled service time, and
   transferring the service request to the service provider.

4. The method as recited in claim 1, wherein adjusting the controlled service time further includes recalculating the controlled service time as a time to process a number of service requests divided by the number of service requests.

5. A system for controlling service provided to a plurality of producers, the system comprising,
   a processor;
   a serializer to control a flow of service requests from the producers, the serializer being a computer program executed by the processor;
   a serializer queue to hold the service requests from the producers;
   a service provider to process requests transferred from the serializer; and
   a service provider queue to hold the service requests coming from the serializer,
   wherein the serializer inhibits temporarily a service request from a producer when a number of service requests awaiting processing exceeds a threshold;
   wherein the serializer transfers the service request from the serializer queue to the service provider queue at a controlled rate equal to a service rate of the service provider, the controlled rate being an inverse of a controlled service time;
   wherein the serializer adjusts the controlled service time to be equal to a current value of a service provider service time for processing service requests, wherein to inhibit temporarily the service request further includes to inhibit the producer making the service request for a producer waiting time, the producer waiting time being equal to the controlled service time multiplied by a sum of a number of producers inhibited plus a predetermined fraction of a maximum length of the serializer queue.

6. The system as recited in claim 5,
   wherein the serializer runs in a processor thread,
   wherein each producer runs in a processor thread,
   wherein the serializer puts to sleep a producer thread to inhibit temporarily the service request.

7. The system as recited in claim 5, wherein the producers, the serializer and the service provider are autonomous entities connected via a network or a system bus.

8. The system as recited in claim 5, wherein the service requests are memory page requests.

9. The system as recited in claim 5, wherein the service provider service time changes over time, wherein the serializer adjusts dynamically the controlled service rate over time to follow the service provider service time.

10. The system as recited in claim 5 further comprising,
    a plurality of service providers working in parallel,
    wherein the serializer distributes requests to the service providers working in parallel.

11. The system as recited in claim 5 further comprising,
    a plurality of service providers working in parallel, and
    a plurality of serializers, each serializer associated with a service provider,
    wherein each serializer manages service requests arriving to the associated service provider.

12. The method as recited in claim 1, wherein inhibiting temporarily the producer includes putting to sleep a thread where the producer is executing.

* * * * *